(12) United States Patent
Scherer et al.

(10) Patent No.: US 7,832,684 B2
(45) Date of Patent: Nov. 16, 2010

(54) RAM AIR CHANNEL FOR THE SUPPLY OF AMBIENT AIR IN AN AIRCRAFT

(75) Inventors: Thomas Scherer, Hamburg (DE); Alexander Solntsev, Hamburg (DE); Michael Heesch, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 29 days.

(21) Appl. No.: 10/582,572

(22) PCT Filed: Dec. 30, 2004

(86) PCT No.: PCT/EP2004/014864

§ 371 (c)(1),
(2), (4) Date: Jun. 12, 2006

(87) PCT Pub. No.: WO2005/063579

PCT Pub. Date: Jul. 14, 2005

(65) Prior Publication Data

US 2007/0125906 A1   Jun. 7, 2007

(30) Foreign Application Priority Data

Dec. 30, 2003  (DE) .............................. 103 61 722

(51) Int. Cl.
  *B64D 33/02*  (2006.01)
(52) U.S. Cl. .................... 244/53 B; 137/15.1; 137/15.2
(58) Field of Classification Search .................. 244/10, 244/53 B, 53 R; 137/15.1, 15.2
See application file for complete search history.

(56) References Cited

U.S. PATENT DOCUMENTS

| | | | | |
|---|---|---|---|---|
| 2,604,278 A | * | 7/1952 | Johnson ................... | 244/53 B |
| 2,699,906 A | * | 1/1955 | Lee et al. ................... | 244/53 B |
| 3,222,863 A | * | 12/1965 | Klees et al. .................. | 138/43 |
| 3,302,657 A | * | 2/1967 | Bullock ..................... | 137/15.2 |
| 3,347,496 A | * | 10/1967 | Opfer, Jr. .................. | 244/53 B |
| 3,446,223 A | * | 5/1969 | Hancock .................... | 137/15.2 |
| 3,618,876 A | * | 11/1971 | Skidmore et al. ......... | 244/53 B |
| 3,664,612 A | * | 5/1972 | Viall et al. ................ | 244/53 B |
| 3,991,782 A | * | 11/1976 | Schwarzler ................ | 137/15.1 |

(Continued)

FOREIGN PATENT DOCUMENTS

DE  10119433 C1  8/2002

(Continued)

OTHER PUBLICATIONS

English Translation of Decision on Granting a Patent for Invention, Russia Patent Office, May 8, 2009.

*Primary Examiner*—Rob Swiatek
*Assistant Examiner*—Philip J Bonzell
(74) *Attorney, Agent, or Firm*—Wood, Herron & Evans, L.L.P.

(57) ABSTRACT

A ram air channel (10) for the supply of ambient air in an aircraft includes a first air inlet (12) and a main flow channel (16) which extends downstream of the first air inlet (12). In order to guarantee that the systems on board the aircraft are supplied, in a simple and reliable way, with the required ambient air in any operational state of the aircraft, i.e. both during the flight and on the ground, the ram air channel (10) has a second air inlet (24) which is independent from the first air inlet (12).

9 Claims, 2 Drawing Sheets

| | U.S. PATENT DOCUMENTS | | | | GB | 2070139 A | 9/1981 |
|---|---|---|---|---|---|---|---|
| 4,132,240 A | * | 1/1979 | Frantz | 137/15.1 | GB | 2208702 A | 4/1989 |
| 4,474,344 A | * | 10/1984 | Bennett | 244/53 B | RU | 2140378 C1 | 10/1999 |
| 6,079,667 A | * | 6/2000 | Gruensfelder | 244/53 B | | | |
| 6,082,669 A | * | 7/2000 | Bardagi et al. | 244/53 B | | | |

FOREIGN PATENT DOCUMENTS

| GB | 1261667 | 1/1972 | * cited by examiner |
|---|---|---|---|

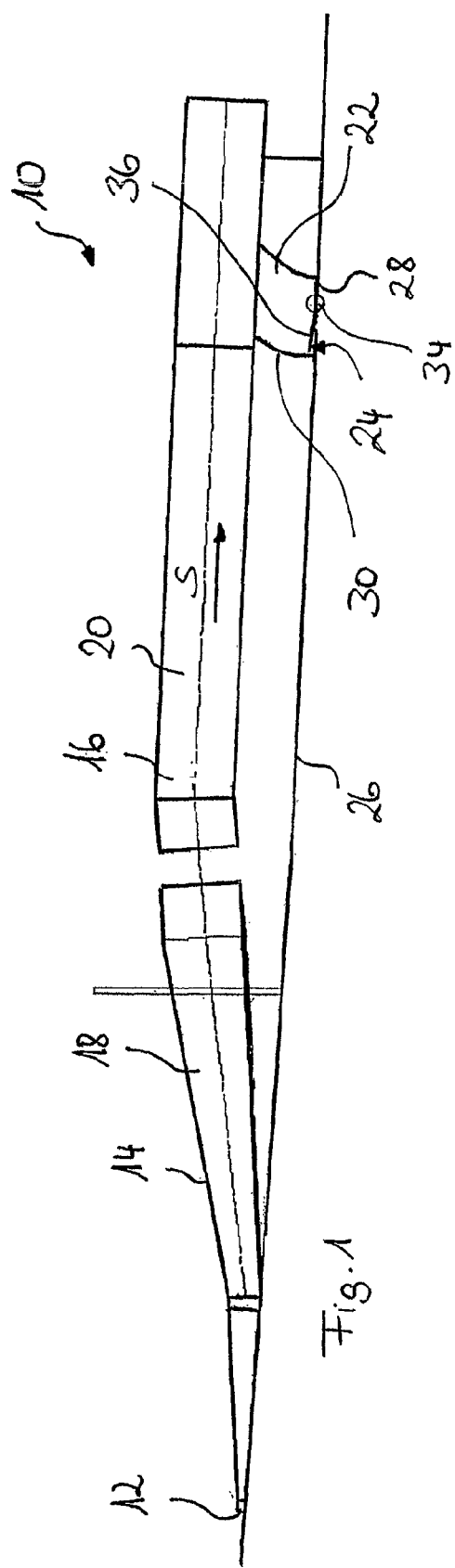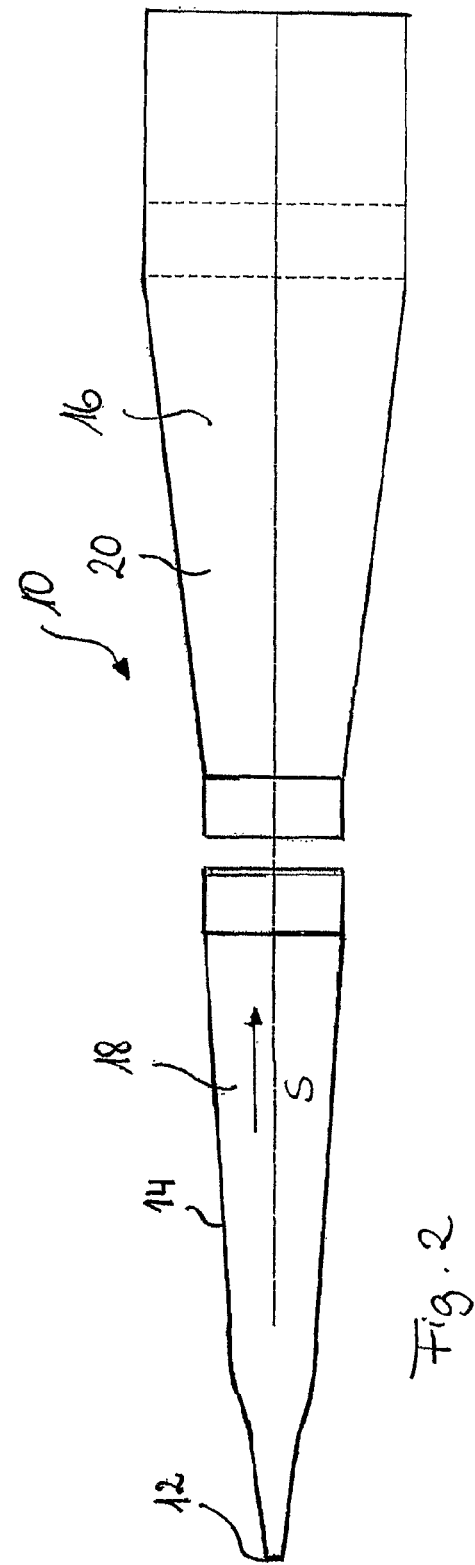

RAM AIR CHANNEL FOR THE SUPPLY OF AMBIENT AIR IN AN AIRCRAFT

The invention relates to a ram air channel for the supply of ambient air in an aircraft which includes a first air inlet and a main flow channel extending downstream of the first air inlet, and a process for the operation of this type of ram air channel.

Ram air channels with an air inlet and a main flow channel extending downstream of the air inlet are used in modern aircraft for the supply of different systems on board an aircraft, such as eg. an air-conditioning system with ambient air. During the flight, ambient air flows through the air inlet into the ram air channel, whereas when the aircraft is on the ground, mechanical devices are used, such as eg. injectors or the formation or active creation of low pressure in the ram air channel so as to create a flow of ambient air through the air inlet. In order to make it possible to adapt the flow of ambient air supplied through the ram air channel to the different requirements of the systems supplied with the ambient air, dependent upon whether the aircraft is in the air or on the ground, there is generally a movable element in the area of the air inlet, or in the area of an air outlet, or in the main flow channel of the ram air channel which allows an increase, a decrease, or even a total closure of the flow cross-section of the air in- or outlet or of the main flow channel. The movable element can, for example, be a freely adjustable inlet or outlet flap which, dependent upon its position, opens a desired flow cross-section of the air in- or outlet and also totally closes the air in- or outlet if so required.

The disadvantage of this type of arrangement is that the movable element, for example in the form of a freely adjustable inlet or outlet flap is subjected to high levels of mechanical loading during the flight, in particular when it is in a position where it opens a reduced flow cross-section. Moreover, with a reduced flow cross-section setting in order to supply the respective systems with ambient air as required, the movable element can lead to aerodynamic losses and increased development of noise during the flight.

The invention is based upon the aim to provide a ram air channel for the supply of ambient air in an aircraft, which is simple in structure and which guarantees an optimised supply of different systems on board the aircraft with ambient air, both during the flight and when the aircraft is on the ground.

In order to solve this problem, the invention proposes providing a ram air channel for the supply of ambient air in an aircraft with a second air inlet which is independent of a first air inlet. The arrangement in accordance with the invention makes it possible, in a simple and reliable way, to supply the systems on board the aircraft with the required ambient air in any operational state of the aircraft, ie. both during the flight and on the ground.

The second air inlet is preferably positioned downstream of the first air inlet and can be connected to the main flow channel of the ram air channel by a side channel extending essentially radially or at a predetermined angle to the main flow channel. Alternatively, it is also possible to provide the second air inlet in the form of an opening in an outer wall of the ram air channel. If a diffuser is provided in the main flow channel downstream of the first air inlet, the second air inlet is preferably positioned downstream of the diffuser.

In a preferred embodiment of the ram air channel in accordance with the invention, the first air inlet has a constant flow cross-section, ie. a movable element positioned in the area of the first air inlet is dispensed with—which can, for example, be an adjustable inlet flap for the setting of the flow cross-section of the first air inlet and which, in established ram air channels, is subjected to particularly high mechanical loading during flights, if it is in a position in which it opens a reduced flow cross-section of the first air inlet. The first air inlet is preferably in the form of a NACA (National Advisory Committee for Aeronautics) inlet, which facilitates optimised air supply as a result of its specific design.

The flow cross-section of the first air inlet is advantageously such that optimal supply of the systems with ambient air on board the aircraft is guaranteed during the flight. By dispensing with a movable element positioned in the area of the first air inlet for the setting of the flow cross-section of the first air inlet, and by adapting the flow cross-section of the first air inlet to the requirements for ambient air supply during the flight, aerodynamic losses and the development of noise at the first air inlet are minimised.

Preferably, a movable element is provided for the setting of a flow cross-section of the second air inlet. The movable element can be designed in such a way that it either opens or closes the second air inlet dependent upon its position. Alternatively, the movable element can also be freely adjustable so that it decreases or increases the flow cross-section of the second air inlet as required dependent upon its position.

The movable element is, for example, in the form of a flap which rotates around an axis. This type of flap is relatively simple and cheap to manufacture and it is light, which is advantageous for use in an aircraft.

In an embodiment of the ram air channel in accordance with the invention, a device is provided for the creation of low pressure in the area of the second air inlet in order to move the movable element into the first position in which it at least partially opens the flow cross-section of the second air inlet. The device for the creation of low pressure can, for example, be a blower or consist of a number of blowers. Alternatively, it is, however, also possible to install a pump to create low pressure in the area of the second air inlet. The movable element is to be designed with regard to its weight and its geometry in such a way that it can be brought to the desired position by the low pressure created in the area of the second air inlet. If the movable element is in the form of a flap which rotates around an axis, the position of the rotation axis, in particular, is to be chosen dependent upon the flap's centre of gravity so that it is possible to operate the flap correctly by means of the low pressure created in the area of the second air inlet. Moreover, by means of the low pressure created in the area of the second air inlet, ambient air is advantageously sucked into the ram air channel, and this can be supplied to the systems on board the aircraft.

Preferably, the movable element is designed in such a way with regard to its weight and its geometry that it moves to a second position by means of a flow of air flowing past the second air inlet during the start-up process of the aircraft, and is held in the second position as a result of ram pressure which builds up in the ram air channel during the flight, and in this position it closes the flow cross-section of the second air inlet. If the movable element is in the form of a flap which rotates around an axis, the position of the axis of rotation, in particular, is to be selected dependent upon the centre of gravity of the flap, so that during the flight it is guaranteed that the flap holds the second air inlet shut as a result of the ram pressure which builds up in the ram air channel.

With an alternative embodiment of the ram air channel in accordance with the invention, an electro-mechanical control device is provided in order to move the movable element to a first position, in which it at least partially opens the flow cross-section of the second air inlet, or to move it to a second position in which it shuts the flow cross-section of the second air inlet. It is clear, however, that with a pressure-controlled movable element, the electro-mechanical control device can also be provided as an additional control device which then also ensures there is correct function of the movable element if the low pressure produced in the area of the second air inlet or the ram air pressure which builds up in the ram air channel during the flight is insufficient in order to bring the movable element to the desired position and/or to hold it in the desired position.

Preferably, a mechanical device is provided in order to hold the movable element in a first position in which it at least partially opens the flow cross-section of the second air inlet, or to hold it in a second position in which it shuts the flow cross-section of the second air inlet. The mechanical device can, for example, be a toggle-lever or a spring mechanism and, with a pressure operated movable element guarantees that the movable element is held in the desired position even if there are fluctuations in pressure. With an electro-mechanically operated movable element, the energy consumption of the electro-mechanical control device can be advantageously reduced by the use of a mechanical device which holds the movable element in the required position.

In a process for the operation of a ram air channel in accordance with the invention, ambient air is supplied through the first air inlet during the flight, ie. the second air inlet is shut during the flight. When the first air inlet has a constant flow cross-section, for example like a NACA inlet, and has proportions to correspond to the requirements for ambient air supply during the flight, optimal supply of the systems with ambient air on board the aircraft is guaranteed during the flight. At the same time, by dispensing with a movable element for the setting of the flow cross-section of the first air inlet, positioned in the area of the first air inlet, aerodynamic losses and the development of noise in the area of the first air inlet can be minimised.

When the aircraft is on the ground, ambient air is supplied through the first and the second air inlet, ie. during ground operation, the second air inlet of the ram air channel is opened. This means that, in a simple way, it can be guaranteed that the systems on board the aircraft can also be correctly supplied with a sufficient quantity of ambient air when the aircraft is on the ground. Moreover, this type of optimised air control for ground operation makes it possible to minimise loss of pressure during ground operation.

Preferred embodiments of the ram air channel in accordance with the invention are described in greater detail with reference to the attached schematic drawings:

FIG. 1 shows a side view of a ram air channel in accordance with the invention,

FIG. 2 shows a top view of the ram air channel in accordance with the invention illustrated in FIG. 1.

Figure 3:
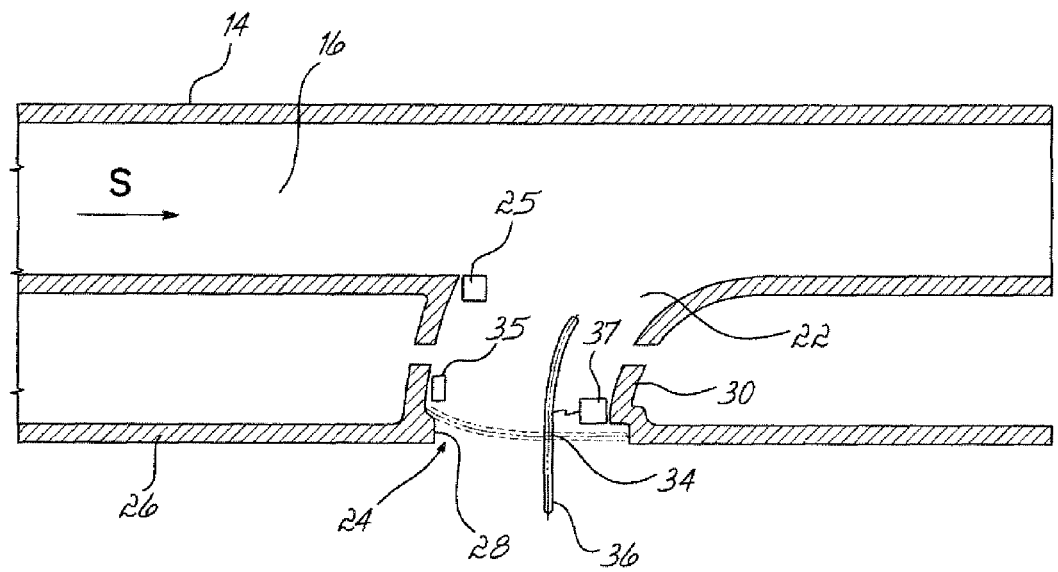
FIG. 3 shows an enlarged illustration of a section of the ram air channel in accordance with the invention illustrated in FIGS. 1 and 2.

In FIGS. 1 and 2, a ram air channel, identified as number 10 in both, for the supply of ambient air in an aircraft is shown, which has a first air inlet 12. The first air inlet 12 is in the form of a NACA inlet, and has a constant flow cross-section, ie. a movable element positioned in the area of the first air inlet 12, for example an adjustable inlet flap for the setting of the flow cross-section of the first air inlet 12, is dispensed with.

A main flow channel 16 extends from the first air inlet 12 alongside an outer wall 14 of the ram air channel 10, and ambient air flows through this in a flow direction S during operation of the ram air channel 10 for the supply of systems on board the aircraft with ambient air. Downstream of the first air inlet 12, a first and a second diffuser 18, 20 are provided in the main flow channel 16.

Downstream of the second diffuser 20, a side channel 22 which, essentially, extends radially to the main flow channel 16, branches off of the main flow channel 16, and this connects the main flow channel 16 to a second air inlet 24. In order to make it possible for ambient air to flow into the second air inlet 24, an opening 28 is provided in an outer skin of the aircraft 26, the cross-section of which corresponds to the cross-section of the second air inlet 24 bordered by an outer wall 30 of the side channel 22.

For the opening and closing of the second air inlet 24, a movable element 36 in the form of a flap which rotates around an axis 34 is provided in the area of the second air inlet 24. In order to move the movable element 36 into a first position in which the movable element 36 opens a flow cross-section of the second air inlet 24, a blower 25 is provided which creates low pressure in the area of the second air inlet 24 during operation. The movable element 36 is designed in such a way with regard to its weight, its geometry, and in particular with regard to the positioning of the rotation axis 34 relative to the centre of gravity of the movable element 36, that it can be brought to the desired first position by means of the low pressure created by the blower in the area of the second air inlet 24. Moreover, the movable element 36 is such that it is moved to a second position, shown by hatches in FIG. 3 by a flow of air flowing past the second air inlet 24 during the start-up process of the aircraft, and as a result of ram air pressure which builds up in the ram air channel 10 during the flight, held in the second position, in which it closes the flow cross-section of the second air inlet 24.

A mechanical device 35 for example in the form of a toggle-lever or a spring mechanism, serves to hold the movable element 36 in the first position in which it at least partially opens the flow cross-section of the second air inlet 24, or in the second position in which it closes the flow cross-section of the second air inlet 24. In this way, it is guaranteed that the movable element is held in the desired position, even if pressure fluctuations arise in the area of the second air inlet 24.

With an alternative embodiment of the ram air channel 10, an electro-mechanical control device 37 is provided in order to move the movable element 36 to a first position in which it at least partially opens the flow cross-section of the second air inlet 24, or to a second position in which it closes the flow cross-section of the second air inlet 24.

The function of the ram air channel 10 is described in the following. During the start-up process of the aircraft, the movable element 36 is moved into the second position by a flow of air flowing past the second air inlet 24, and in this position it closes the flow cross-section of the second air inlet 24. During operation, the movable element 36, supported by the mechanical device, is held in the second position for the whole of the flight by means of the ram pressure in the ram air channel 10. The supply of ambient air is therefore realised exclusively by means of the first air inlet 12. Because the first air inlet 12 in the form of a NACA inlet with a constant flow cross-section is proportioned to correspond to the requirements for ambient air supply during the flight, an optimal supply of the systems on board the aircraft with ambient air during the flight is guaranteed by the first air inlet 12. At the same time, by dispensing with a movable element for the setting of the flow cross-section of the first air inlet 12, positioned in the area of the first air inlet 12, aerodynamic losses and the development of noise in the area of the first air inlet 12 can be minimised.

When the aircraft is on the ground, the blower, used to operate the movable element 36 which shuts the second air inlet 24 during the flight, is started, whereupon low pressure builds up in the area of the second air inlet 24. By means of the low pressure which builds up in the area of the second air inlet 24, the movable element 36 moves into its first position, in which it opens the flow cross-section of the second air inlet 24. During operation, the movable element 36, supported by the mechanical device, is held in the first position by means of the low pressure which predominates in the area of the second air inlet 24 for the whole time that the aircraft is on the ground and during which it is necessary to supply the systems on board the aircraft with ambient air.

Moreover, by means of the low pressure which predominates in the area of the second air inlet 24, ambient air is sucked into the ram air channel 10 by means of the second air inlet 24, and this can be conveyed to the systems on board the aircraft. It can thus be guaranteed, in a simple way, that the systems on board the aircraft are correctly supplied with a sufficient quantity of ambient air when the aircraft is on the ground. Moreover, this type of optimised air supply for ground operation makes it possible to minimise losses of pressure during ground operation.

It is clear that the movable element 36 can, for example, by means of the electro-mechanical control device, be brought into a position, in which it only opens a reduced flow cross-section of the second air inlet 24. It is thus possible, in a simple way, to supply a quantity of ambient air which corresponds to the requirement of the systems on board the aircraft. Finally, it is, of course, also possible to close the second air inlet 24 of the ram air channel 10 during ground operation. For example, the electro-mechanical control device can be used in order to move the movable element 36 into its second position in which it closes the flow cross-section of the second air inlet 24.

The invention claimed is:

1. Ram air channel for supplying ambient air to a system on board an aircraft, comprising:
   a first air inlet;
   a main flow channel extending downstream of the first air inlet;
   a second air inlet independent from the first air inlet;
   a movable element located in the air flow path of the second air inlet for setting a flow cross-section of the second air inlet, the movable element being movable between a first at least partially open position and a second closed position; and
   a device for creating low pressure in the second air inlet, the device including at least one of: a blower and a pump each fluidly coupled and adjacent to the second air inlet and operable to cause low pressure in the second air inlet proximate to the movable element, so as to move the movable element into the first position to at least partially open the flow cross-section of the second air inlet.

2. Ram air channel in accordance with claim 1 wherein the second air inlet is connected to the main flow channel of the ram air channel by a side channel which extends at a predetermined angle to the main flow channel.

3. Ram air channel in accordance with claim 1 wherein the first air inlet has a constant flow cross-section.

4. Ram air channel in accordance with claim 1 wherein the movable element is in the form of a flap which rotates about an axis.

5. Ram air channel in accordance with claim 1, further comprising:
   an electro-mechanical control device operable to assist the device in moving the movable element between the first position to at least partially open the flow cross-section of the second air inlet, and a second position to close the flow cross-section of the second air inlet.

6. Ram air channel in accordance with claim 1, further comprising:
   a mechanical device operable to hold the movable element in the first position to at least partially open the flow cross-section of the second air inlet, or in a second position to shut the flow cross-section of the second air inlet.

7. Ram air channel in accordance with claim 1, wherein the system on board the aircraft to be supplied with ambient air is a cooling system.

8. Process for the operation of a ram air channel for supplying ambient air a system on board an aircraft, comprising:
   controlling a movable element so as to set a flow cross-section of a second air inlet, the movable element being located in the air flow path of the second air inlet and being movable between a first at least partially open position and a second closed position, the aircraft having a first air inlet and a main flow channel extending downstream of the first air inlet, the controlling further including,
   during flight, positioning the movable element in the second position to close the flow cross-section of the second air inlet so that ambient air is supplied to the aircraft by the first air inlet only, and
   when the aircraft is on the ground, positioning the movable element into the first position by low pressure created by a device, thereby to at least partially open the flow cross-section of the second air inlet so that ambient air is supplied to the aircraft by the first and the second air inlets, the device including at least one of a blower and a pump each fluidly coupled and adjacent to the second air inlet and operable to cause low pressure in the second air inlet proximate to the movable element.

9. Process in accordance with claim 8, wherein the system on board the aircraft to be supplied with ambient air is a cooling system.

* * * * *